(12) United States Patent
Chen et al.

(10) Patent No.: US 10,711,804 B2
(45) Date of Patent: Jul. 14, 2020

(54) AIR PURIFIER

(71) Applicant: Qingdao Randall Aerodynamics Engineering LLC, Jiaozhou (CN)

(72) Inventors: Chunmei Chen, Qingdao (CN); Ryan Michael Randall, Tucson, AZ (US)

(73) Assignee: QINGDAO RANDALL AERODYNAMICS ENGINEERING LLC, Jiaozhou (CN)

( * ) Notice: Subject to any disclaimer, the term of this patent is extended or adjusted under 35 U.S.C. 154(b) by 126 days.

(21) Appl. No.: 15/920,613

(22) Filed: Mar. 14, 2018

(65) Prior Publication Data

US 2018/0202465 A1   Jul. 19, 2018

Related U.S. Application Data

(63) Continuation of application No. PCT/CN2016/098851, filed on Sep. 13, 2016.

(30) Foreign Application Priority Data

Sep. 14, 2015 (CN) .......................... 2015 1 0581044

(51) Int. Cl.
*F04D 29/70* (2006.01)
*E06B 7/02* (2006.01)
(Continued)

(52) U.S. Cl.
CPC ....... *F04D 29/703* (2013.01); *B01D 46/0023* (2013.01); *B01D 46/0045* (2013.01);
(Continued)

(58) Field of Classification Search
CPC ........ F04D 29/703; F04D 25/08; F04D 25/12; F04D 29/70; F04D 25/06; F04D 29/541;
(Continued)

(56) References Cited

U.S. PATENT DOCUMENTS 2,100,072 A * 11/1937 Eilber ................... F24F 3/1603
454/265
2,594,688 A * 4/1952 Shapiro ................... F24F 7/013
55/467

(Continued)

FOREIGN PATENT DOCUMENTS

CN        203823980 U    9/2014
CN        204476878 U    7/2015
(Continued)

*Primary Examiner* — Aaron R Eastman
(74) *Attorney, Agent, or Firm* — Bayramoglu Law Offices LLC

(57) ABSTRACT

An air purifier system characterized by a housing, a fan, and a motor, as well as a docking ring located at the outer edge of the inlet side of the air purifier system, a seat below the housing, a prefilter or barrier upstream of the fan, and a filter downstream of the fan. An air purifier system characterized by an upstream-to-downstream airflow path that includes an axial fan, a diffuser, and a filter, in that relative order, with an electric motor held along the centerline of the housing by one or more supports and/or guide vanes. A docking ring that facilitates attachment of a screen-like, mesh-like, cloth-like, or paper-like filter to a machine capable of air purification, characterized by having a large hole through which air passes and by attachment to the machine utilizing any tongue and groove system, for which installation and removal of the docking ring is achieved, in whole or in part, by rotation of said docking ring relative to the machine.

12 Claims, 9 Drawing Sheets

(51) Int. Cl.

| | |
|---|---|
| *F04D 25/08* | (2006.01) |
| *F24F 3/16* | (2006.01) |
| *F24F 13/20* | (2006.01) |
| *F24F 7/007* | (2006.01) |
| *F24F 13/28* | (2006.01) |
| *B01D 46/00* | (2006.01) |
| *B01D 46/10* | (2006.01) |
| *B01D 46/52* | (2006.01) |
| *F04D 25/12* | (2006.01) |
| *F24F 7/013* | (2006.01) |
| *F24F 13/32* | (2006.01) |
| *F04D 25/06* | (2006.01) |
| *F04D 29/54* | (2006.01) |

(52) U.S. Cl.
CPC ........... *B01D 46/10* (2013.01); *B01D 46/521* (2013.01); *E06B 7/02* (2013.01); *F04D 25/08* (2013.01); *F04D 25/12* (2013.01); *F04D 29/70* (2013.01); *F24F 3/16* (2013.01); *F24F 3/1603* (2013.01); *F24F 7/007* (2013.01); *F24F 7/013* (2013.01); *F24F 13/20* (2013.01); *F24F 13/28* (2013.01); *E06B 2007/023* (2013.01); *F04D 25/06* (2013.01); *F04D 29/541* (2013.01); *F24F 13/32* (2013.01); *F24F 2003/1614* (2013.01); *F24F 2013/205* (2013.01); *F24F 2221/38* (2013.01)

(58) Field of Classification Search
CPC ........... B01D 46/0023; B01D 46/0045; B01D 46/10; B01D 46/521; E06B 7/02; F24F 3/16; F24F 3/1603; F24F 7/007; F24F 7/013; F24F 13/20; F24F 13/28; F24F 13/32; F24F 2003/1614; F24F 2013/205; F24F 2221/38

USPC ....................................................... 415/121.2
See application file for complete search history.

(56) References Cited

U.S. PATENT DOCUMENTS

| | | | | |
|---|---|---|---|---|
| 2,950,859 | A | * | 8/1960 | Kirk ...................... F04D 29/703 417/363 |
| 3,438,219 | A | * | 4/1969 | Brugler ................... F24F 13/20 62/262 |
| 3,572,234 | A | * | 3/1971 | Schoenthaler ......... F24F 3/1603 454/188 |
| 4,560,395 | A | | 12/1985 | Davis |
| 5,368,262 | A | * | 11/1994 | Garrity ................. F04D 29/601 211/162 |
| 5,803,709 | A | * | 9/1998 | Matthews ............. F04D 29/545 415/182.1 |
| 7,094,142 | B1 | | 8/2006 | Maskell |
| 2002/0007735 | A1 | * | 1/2002 | Volo ................... B01D 46/0005 96/134 |
| 2011/0142997 | A1 | * | 6/2011 | Jonsson ................. B65D 47/20 426/115 |
| 2012/0043295 | A1 | * | 2/2012 | Webster ................. B65D 47/06 215/44 |
| 2012/0240848 | A1 | * | 9/2012 | Amundsen ............. B01D 46/10 118/429 |
| 2014/0331859 | A1 | | 11/2014 | Gruenbacher et al. |
| 2015/0316274 | A1 | * | 11/2015 | Gu ........................ B01D 53/26 55/309 |

FOREIGN PATENT DOCUMENTS

| | | |
|---|---|---|
| CN | 105089465 A | 11/2015 |
| CN | 205172379 U | 4/2016 |
| GB | 2428783 A | 2/2007 |
| JP | S6451117 A | 2/1989 |
| WO | 2008109036 A1 | 9/2008 |

* cited by examiner

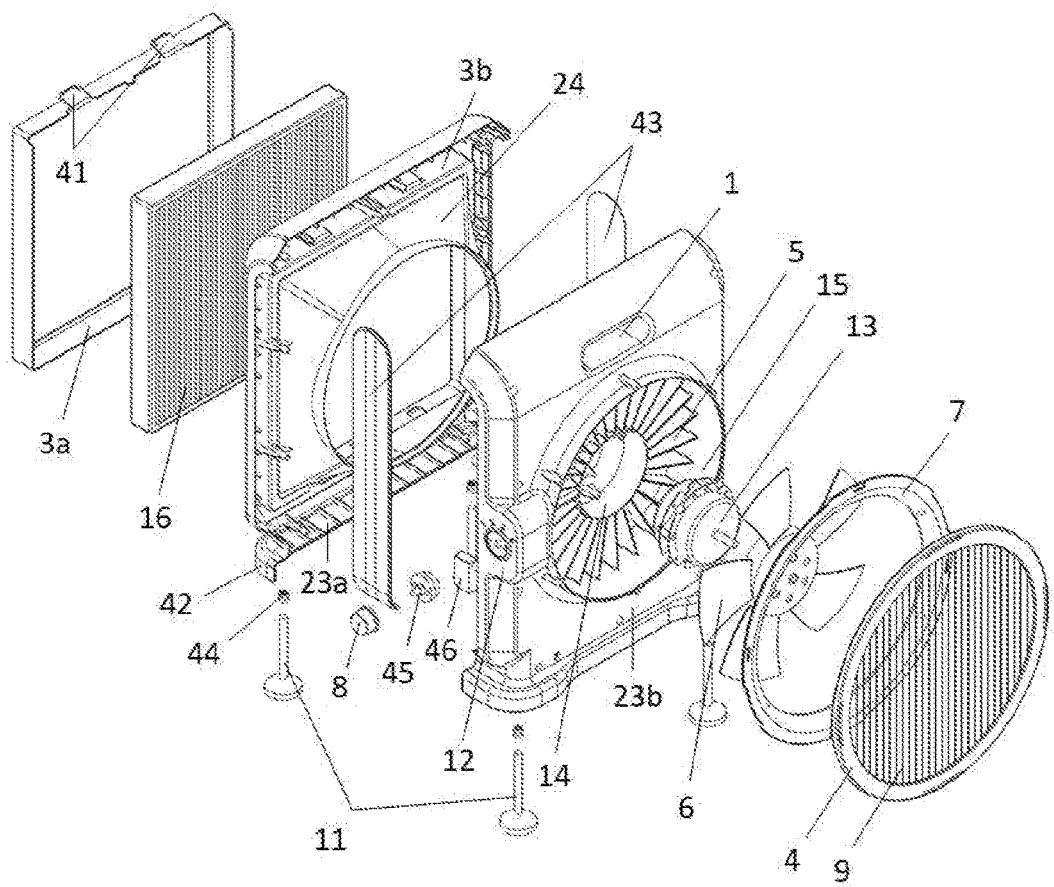
FIG 19
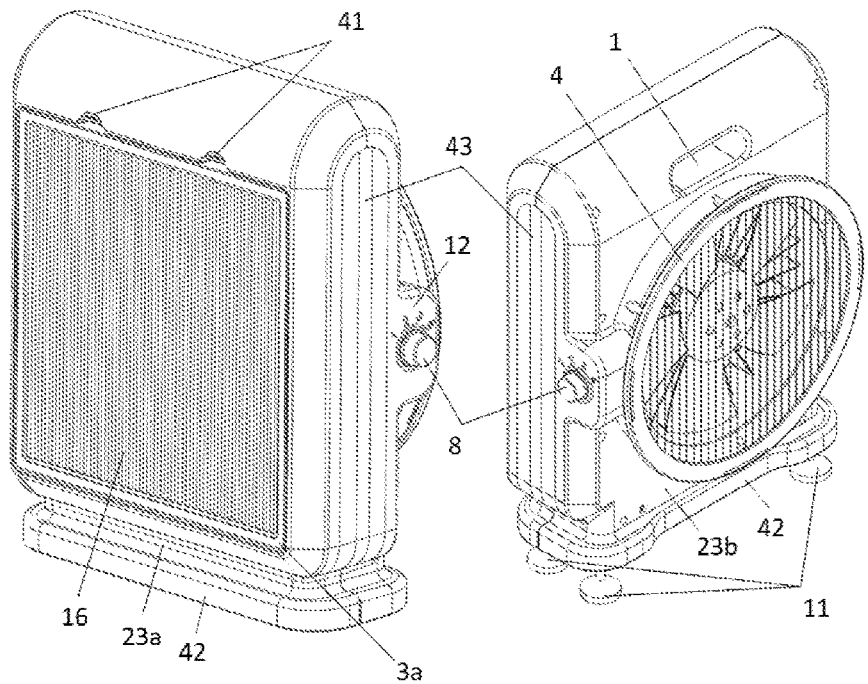
FIG 20
FIG 21

AIR PURIFIER

CROSS-REFERENCE TO RELATED APPLICATIONS

This application is a continuation-in-part of International Application PCT/CN2016/098851, with an international filing date of Sep. 13, 2016, now pending, which claims priority to People's Republic of China Application (CN) 201510581044.2, with a filing date of Sep. 13, 2015.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING," A TABLE, OR A COMPUTER

Not Applicable

BACKGROUND OF THE INVENTION

(1) Field of Invention

The present invention relates to the field of air purification.

(2) Description of Related Art

Existing air purifiers use different techniques to remove particulate matter from the air, including placing a positive or negative charge on a particle and the reverse charge on a collection plate. These ionic air purifiers are efficient, but ionized particles escape from into the air and damage lung tissue. Other air purifiers use thin or coarse filters to reduce flow resistance and improve volumetric flow rate. Unfortunately, they don't effectively filter very small (PM 2.5) particles, which can permanently degrade lung function over time. Air purifiers with thick and fine filters (HEPA and HEPA-like) work, but pushing air through thick and fine filters consumes a lot of energy, which is exacerbated by mediocre-to-poor aerodynamic design.

The correct type of fan must be selected to maximize performance. The preferred fan (axial, mixed, centrifugal) depends on a combination of parameters and the Cordier Diagram. For typical low occupancy air filtration cases an axial fan maximizes potential performance and efficiency. Despite this, almost all existing low occupancy air purifiers use centrifugal fans.

Existing purifiers include: elbows, bends, corners, loops, blunt plastic grates, flow constriction through sharp holes/openings, discontinuous surfaces, flow obstructions without fairings (i.e. motors), fans with inappropriate geometry, and/or long ducting. Axial fans are sensitive to spoiled flow and would not perform well in these air purifiers. Centrifugal fans, on the other hand, are not sensitive to spoiled flow. Air purifiers with high flow resistance (e.g. having a HEPA-like filter) use centrifugal fans almost exclusively. In so doing, they accept lower energy efficiency. In addition, centrifugal fans work at higher rotation rates, which is associated with greater noise production.

A few air purifiers utilize axial fans with HEPA-like filters. They consist of a HEPA-like filter strapped to the front of an off-the-shelf desktop fan; they consume electricity while being of almost no benefit to their users.

Existing air purifiers use custom, oddly-sized, or oddly-shaped replacement filters, which allow air purification companies to charge high prices for them. If the custom filter becomes unavailable then the entire air purification system becomes unusable.

BRIEF SUMMARY OF THE INVENTION

The present invention is directed to an air purifier system. A simple embodiment of the air purifier, as depicted in FIG. 1, has a flow path from back-to-front. Air flows through the docking ring (4) and then through either a prefilter (9) and/or a barrier. A barrier could be any arrangement of material that protects the fan blades from foreign objects and/or people's fingers from the fan blades. A prefilter (9) could provide similar protection while removing large dust particles from the flow and reducing flow turbulence.

The fan (6) is surrounded by a housing (15) that improves fan (6) effectiveness near its blade tips. This is done by reducing tip vortices, which are caused by flow acceleration from the high-pressure side (downstream) of the blades to their low-pressure side (upstream) around blade tips. The fan (6) is driven by a motor (13). It represents the aerodynamic heart of the air purifier system, providing energy to the flow and pushing air downstream. Custom fan (6) design is critical to overall system performance. The flow must approach blades tangent to their leading edges (28), flow over blades without separation, and leave tangent to the blade's trailing edges (29).

A filter (16) can remove virtually all of the dust from the air, including tiny particles smaller than 2.5 microns in characteristic diameter. Outgoing air is clean and healthy, and the energy consumed by the motor (13) is reasonably low.

The high efficiency embodiment of FIG. 9 and the mass production embodiment of FIG. 19 use additional elements to achieve excellent performance, including: an inlet (7), hub dome (34), guide vanes (5), motor cover (14), and diffuser (24). The most dramatic contributors to the air purifier's excellent aerodynamic performance are: the custom axial fan (6) within a housing (15), the diffuser (24), and the filter (16), in that upstream-to-downstream order, and to a lesser extent, the guide vanes (5) (must be downstream of the fan) and inlet (7) (must be upstream of the fan).

The inlet (7) allows flow to smoothly enter the housing without separation, which would cause "vena contracta" and reduce the fan's (6) efficiency near its blade tips. (31). The hub dome (34) allows flow to remain attached as it approaches blade roots (30) to improve fan (6) efficiency in that region. The motor cover (14) allows the flow to travel smoothly over the motor without separation.

The fan (6) introduces "swirling" (a circumferential velocity component) into the flow due to its rotation. This circumferential velocity component does not contribute to axial flow through the filter (16) and represents wasted energy. Guide vanes (5) force the circumferential flow to travel in a purely axial direction to recover kinetic energy that would otherwise be wasted.

The diffuser (24) decelerates the flow without causing separation along its walls. As the flow decelerates through the diffuser (24) its static pressure increases and reaches a maximum just behind the filter (16). The flow rate through the filter (16) is proportional to the static pressure behind it.

The air purifier system provides a technical solution for ventilation and purification, which is achieved by placing the air purifier system on a windowsill or stand (40) and using the height and level adjusters (11) to align the docking ring (4) with an air inlet hole (35), as seen in FIG. 13. Turning on the air purifier drives ventilation air through a filter before allowing it to exhaust into a space. The inside space becomes slightly pressurized, which forces stale air out through leaks. In so doing, little or no dirty air leaks-in and diffuses throughout a space, so only a small amount of air must be forced through the filter. This technique requires approximately one-eighth the amount of energy required to provide ventilation and clean air by slightly opening windows and using a standalone in-room filter. The air purifier system is not expensive to produce and can be used in rented and leased spaces. Installation can be achieved by cutting an air inlet hole (35) in a window, or by replacing an existing window screen with a transparent plastic sheet having an air inlet hole (35) cut into it.

The air purifier system provides a technical solution to the non-multifunctional nature of existing air purifier systems.
a. In-room filtration—in lightly occupied spaces, the air purifier system can be placed anywhere and turned-on.
b. Personal desktop filtration—in heavily occupied spaces, the air purifier system can be placed on a desk and directed towards an individual's face for personal air filtration.
c. Desktop cooling—do the same as for b. but remove the filter (16).
d. Forced ventilation and filtration—align the air purifier system with an air inlet hole (35) and run it. If the room is too well-sealed, open a window slightly to allow outflow.
e. Forced ventilation without filtration—do the same as for d. but remove the filter (16).

Compared with the prior art, the air purifier system is: energy efficient, versatile, easy to install, and easy to clean. It features low cost manufacturing and filter replacement.

BRIEF DESCRIPTION OF THE SEVERAL VIEWS OF THE DRAWING

FIG. 19 is an exploded perspective view of a high-efficiency embodiment appropriate for mass-production.

FIG. 20 is a perspective view of the FIG. 19 embodiment from the front with legs retracted.

FIG. 21 is a perspective view of the FIG. 20 embodiment from the rear with legs partially-extended.

DETAILED DESCRIPTION OF THE INVENTION

(1) Definitions

Figure 1:
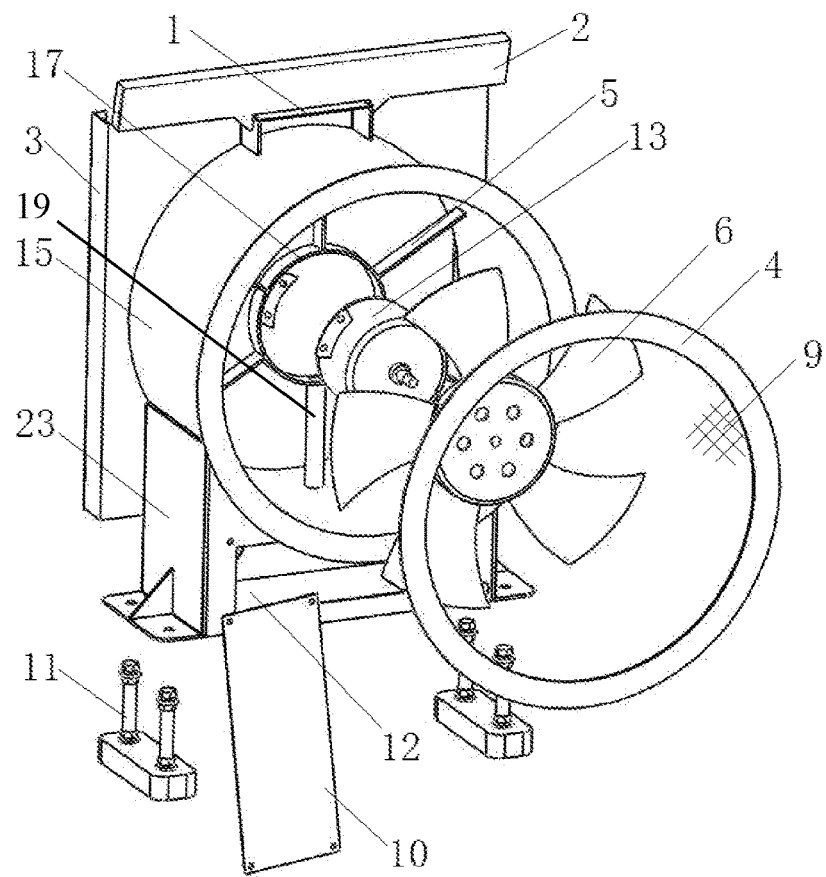
FIG. 1 is a schematic drawing of a simple embodiment of the air purifier system in an exploded perspective view.
Figure 2:
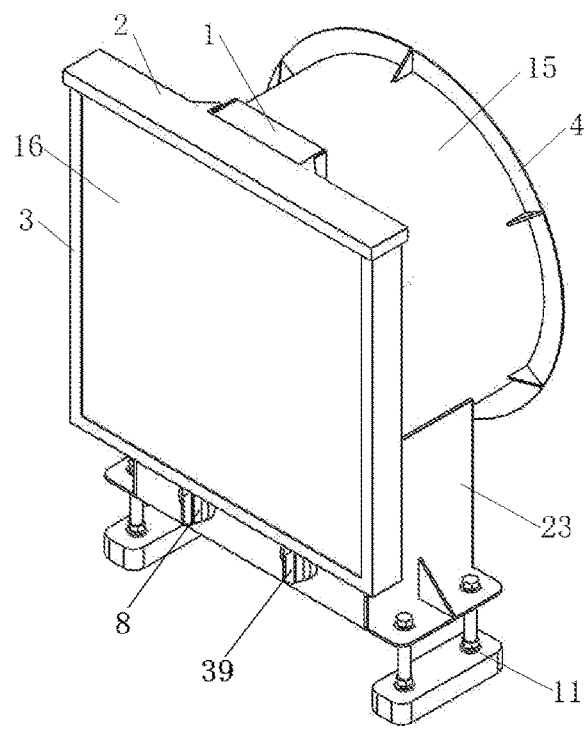
FIG. 2 depicts the previous embodiment in an assembled perspective view.

The term "air purifier" is understood to include: air purifiers, ventilation purifiers, air filtration systems, and all other machines capable of filtering particulate matter out of air.

(2) List of Symbols

1—carry handle; 2—lid; 3—filter housing; 4—docking ring; 5—motor supports/guide vanes; 6—fan; 7—inlet; 8—speed adjustment knob; 9—prefilter; 10—electrical control box cover; 11—height and tilt adjuster; 111—height adjustment mechanism; 112—tilt adjustment mechanism; 12—electrical control box; 13—motor; 14—motor cover; 141—air vents (on the motor cover); 15—housing; 16—filter; 17—inner ring; 18—outer ring; 19—electrical conduit; 20—wind-blocking sheet; 21—window frame; 22—damper/stiffener; 23—seat; 24—diffuser; 25—hub; 28—blade leading edge; 29—blade trailing edge; 30—blade root; 31—blade tip; 32—blade airfoils; 33—hub ring; 34—hub dome; 341—vents (on the hub dome); 35—air inlet hole; 36—connecting ring; 37—safety cage; 38—hose; 39—timer control knob; 40—windowsill/stand; 41—snaps; 42—skirt; 43—side-panels; 44—threaded elements; 45—rotary switch; 46—capacitor; 47—tongue; 48—groove; 49 protruding part; 50—slot, 51—hub beams; 52—hub sidewall.

(3) Simple Embodiment

The present invention is directed to an air purifier system, for which FIGS. 1, 2, 13, and 14 depict a simple embodiment. This simple embodiment includes an axial fan (6), a housing (15), a motor (13), and motor supports (5). For the embodiment in FIG. 1, the motor supports (5) are radially-oriented bars that connect to a central ring onto-which the motor is secured using screws such that the motor (13) is fixed at the center of the housing (15) with its shaft-axis normal to the vertical plane. One of the motor supports (5) is modified to allow electrical wires to safely run from the electrical control box (12) to the motor (13); this support is called the electrical conduit (19). The electrical control box

(12) has a cover (10) and a speed adjustment knob (8), as well as a timer control knob (39).

The fan (6) is mounted on the output shaft of the motor (13). There is a prefilter (9) upstream of the fan (6), which can consist of a stainless-steel screen, and a filter (16) located downstream of the fan. The filter (16) is not limited to a HEPA filter, but a HEPA filter is preferred. Toward the outer edge of the prefilter (9) there is a docking ring (4). The docking ring (4) can maintain tension in the prefilter (9) and be used to connect the prefilter (9) to the housing (15). The air purifier system rests on a seat (23), which is located below the fan (6). Height and tilt adjusters (11) connect to the seat (23). The four threaded elements can be turned to provide minute adjustment of the height and tilt of the air purifier system, allowing the docking ring (4) to be easily aligned with a connecting ring (36) during installation at a window, when desired. For special circumstances and applications, the height adjustment mechanism may consist of two tubes that can slide relative to one-another, increasing the total height adjustment range. In this embodiment the docking ring (4) has an annular shape, but the docking ring (4) in-general is not limited to an annular shape.

During simultaneous ventilation and forced filtration air from outside is sucked through the prefilter (9). The prefilter (9) causes a loss of flow energy, but it also reduces turbulence in the outside air. Turbulence reduction partially offsets energy lost through the prefilter because it improves the aerodynamic efficiency of the fan (6). The prefilter (9) is also an important component because it prevents premature clogging of the filter (16) due to insects, fibers, and large dust particles, and it protects both the fan (16), and people's fingers.

The simple embodiment has a square filter housing (3) to accommodate a standard square-shaped filter. The filter housing (3) has a lid (2) with a front lip that covers the front edges of the filter to hold it in place and to prevent dirty air from bypassing the filter (16), leaking into the building, and reducing overall air quality. For the simple embodiment of FIG. 1 the lid (2) conveniently hinges about the carry handle (1) and is recessed to provide space for the filter (16).

The filter (16) can be easily installed into and removed from the filter housing (3) for replacement or cleaning by opening the lid (2) and sliding the filter (16) in or out. For example, the filter housing (3) can have a U shape whose inner-side has a groove for the filter (16) to slide into. The lid (2) is above the filter housing (3). The carry handle (1) is on the upstream side of the lid (2). The filter (16) can be removed to provide high flow-rate pure ventilation, which is useful when the outside air is relatively clean and rapid indoor ventilation is desired, or when the indoor temperature is less comfortable than the outdoor temperature. If there are small children or pets in the home then a safety cage (37) can replace the filter in the filter housing (3). The air purifier system can also include additional filters. Examples include more than one prefiltration layer or a non-mesh type prefilter upstream of the filter (6), as well as an activated carbon filter downstream of the filter (6), which is used to absorb odors and harmful chemical vapors. Further, the air purifier system may include an electrical heating device to increase comfort during cold weather use. The air purifier system can be removed from the window and used on a desktop for pure filtration without ventilation, making it extremely versatile. Users are cautioned that the preferred technique is to filter incoming air before it enters a building, not after it has diffused throughout the building; the former is much more effective and efficient than the latter.

The simple embodiment has an axial fan (6) with a small hub-to-tip ratio. Planar projections of a blade's leading (28) and trailing edge (29), as viewed from downstream looking-in, (FIG. 5, 7) produce parabolas and the blade's root (30) and tip (31) are semi-circular. The blade airfoils are constructed using parabolic camber-lines projected onto cylindrical surfaces coaxial with the centerline of the hub dome (34). The blades are of constant thickness in the circumferential direction and linearly-tapered in the radial direction (32).

(4) High Efficiency Embodiment

A high efficiency embodiment is shown in FIGS. 9-12. It has additional parts: the inlet (7), diffuser (24), motor cover (14), a novel axial fan (6), and novel guide vanes (5). The novel axial fan (6) and guide vanes (5) are described at the end of this section. The structure and function of the inlet (7), diffuser (24), motor cover (14) and guide vanes (26) are described as follows.

The inlet (7) has a streamlined horn-like shape and it is located between the prefilter (9) and the housing (15). The inlet (7) accelerates the flow and allows the air to flow smoothly into the housing (15) preventing flow separation and reattachment near the housing's (15) otherwise sharp corners, which is called vena contracta. Vena contracta reduces the aerodynamic efficiency of the fan blades (6) near their tips. The net result of the inlet (7) is an improvement in system efficiency on the order of a few percent. The docking ring (4) here is the same as for the simple embodiment.

The high efficiency embodiment includes a diffuser (24) located between the housing (15) and the filter (16). The diffuser (24) is tapered; It has a smaller cross-sectional area on the housing (15) side and a larger cross-sectional area, which may be round, square, or some other shape, on the filter (6) side. The diffuser's (24) smallest cross-section should expand smoothly to its largest cross-section. If the diffuser (24) is too short then flow separation will result, leading to reduced efficiency. If the diffuser (24) is too long then the air purifier system will not balance over a windowsill/shelf without fixing or fastening its legs to the windowsill or shelf. In general, the greater the diffusion area ratio (outlet area divided by inlet area) the greater the required length to avoid flow separation. The diffusion area ratio can be increased without changing the outlet area by increasing the inlet area, which is essentially an annulus from the hub diameter of the fan (6) to the inner diameter of the housing (15). Diffuser (24) considerations encourage a smaller fan (6) hub diameter and a larger tip diameter than might otherwise be used. The diffuser's (24) length is selected ensure that fully-attached flow is maintained on the walls of the diffuser as the flow expands from the smallest cross-section to the largest cross-section of the diffuser (24). For this high efficiency embodiment, the diameter of the upstream circular part of the diffuser (24) is no bigger than that of a side-length on the downstream side. The ultimate effect of the diffuser (24) is to increase the total volumetric flow rate of air through the air purifier system (all else being equal). A logical material choice for the diffuser (24) is plastic. For the high efficiency embodiment of FIGS. 9-12, the filter housing (3) and lid (2) are plastic, and the lid (2) snaps in-place.

This high efficiency embodiment utilizes a half ellipsoidal motor cover (14) whose open-end attaches to the guide vanes (5) and whose closed end has air vents (141), which allow motor cooling air to flow out. The flow rate of cooling air is very small, so it does not significantly reduce the efficiency of the entire air purifier system. The motor cover (14) has a continuous surface of continuous slope to avoid flow separation, helping the air downstream of the fan (6) to flow smoothly around the motor (13), thereby reducing flow resistance. Plastic is a logical material choice for the motor cover (14), as well as the other aerodynamic surfaces. Using a rounded hub dome (34), as opposed to a flat hub face, can improve the efficiency of the fan blades near their roots (30).

Figure 3:
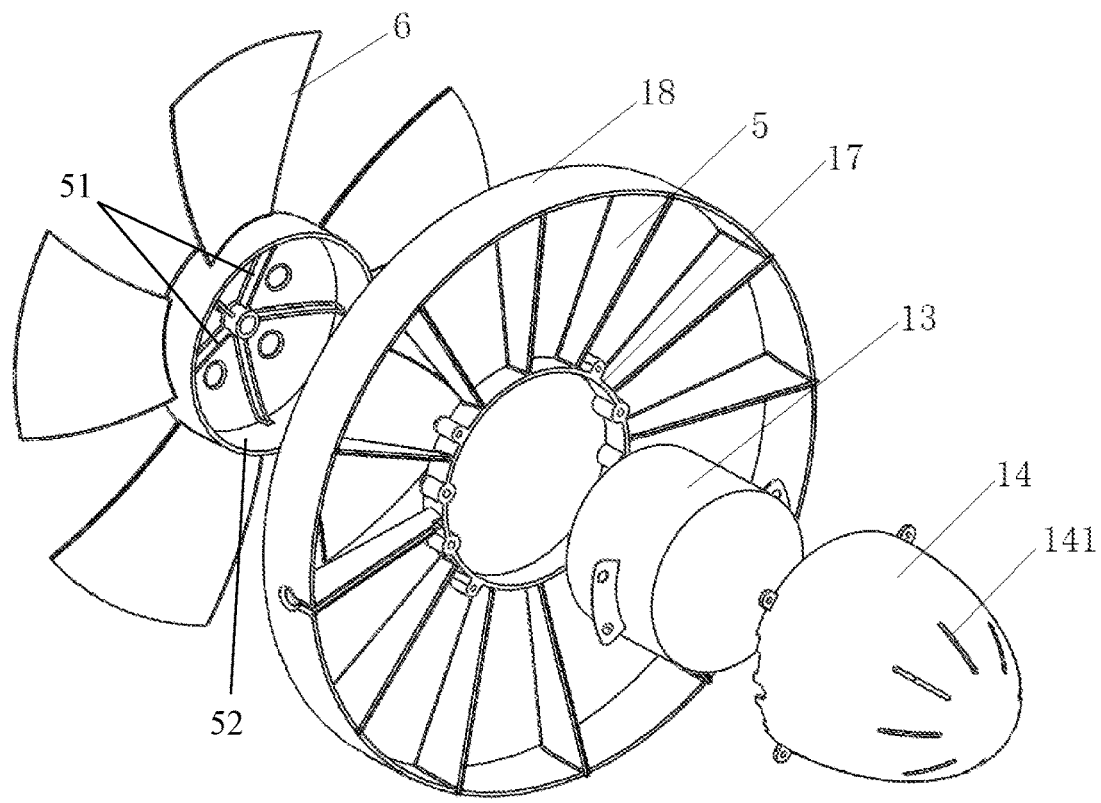
FIG. 3 is a schematic drawing of the fan, motor, motor cover, and guide vane assembly in an exploded perspective view.
Figure 4:
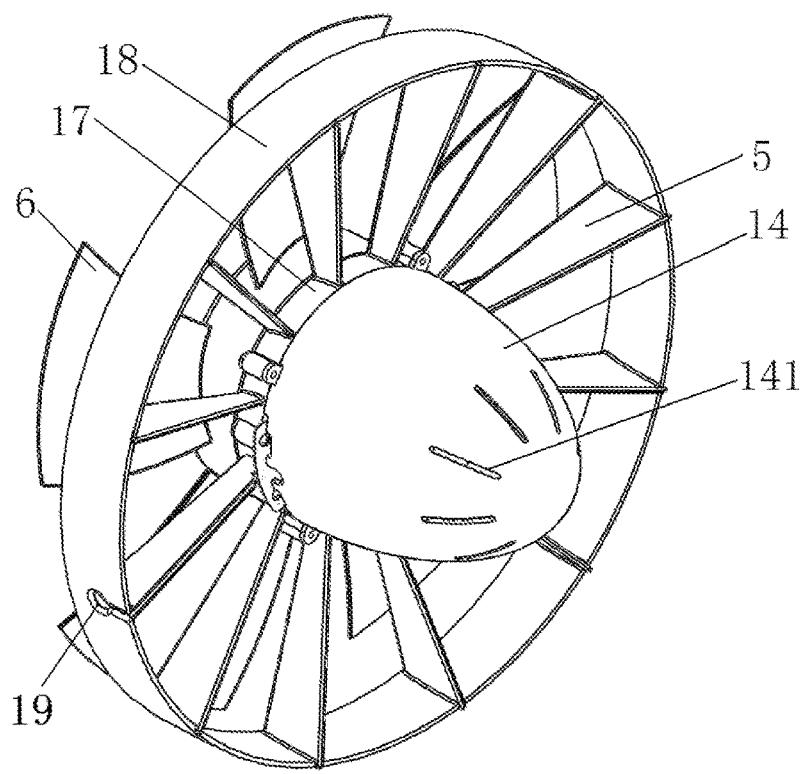
FIG. 4 is an assembled version of FIG. 3.

Vents (341, 141) are placed in the hub dome (34) and the motor cover (14) to allow a small amount of air to flow over the motor (13) for cooling, and to prevent flow separation near the outer downstream face of the motor cover (14). Cooling air flow is driven by suction created just behind the hub dome (34) that arises due to the rotation of radially-oriented hub beams (51) (FIG. 3) that induce centrifugal forces within the flow causing air to enter through the vents (341) and spiral outward toward the hub sidewalls (52) then downstream and around the motor (13). Hub beams (51) also serve as structural members.

(5) Mass Production Embodiment

Figure 9:
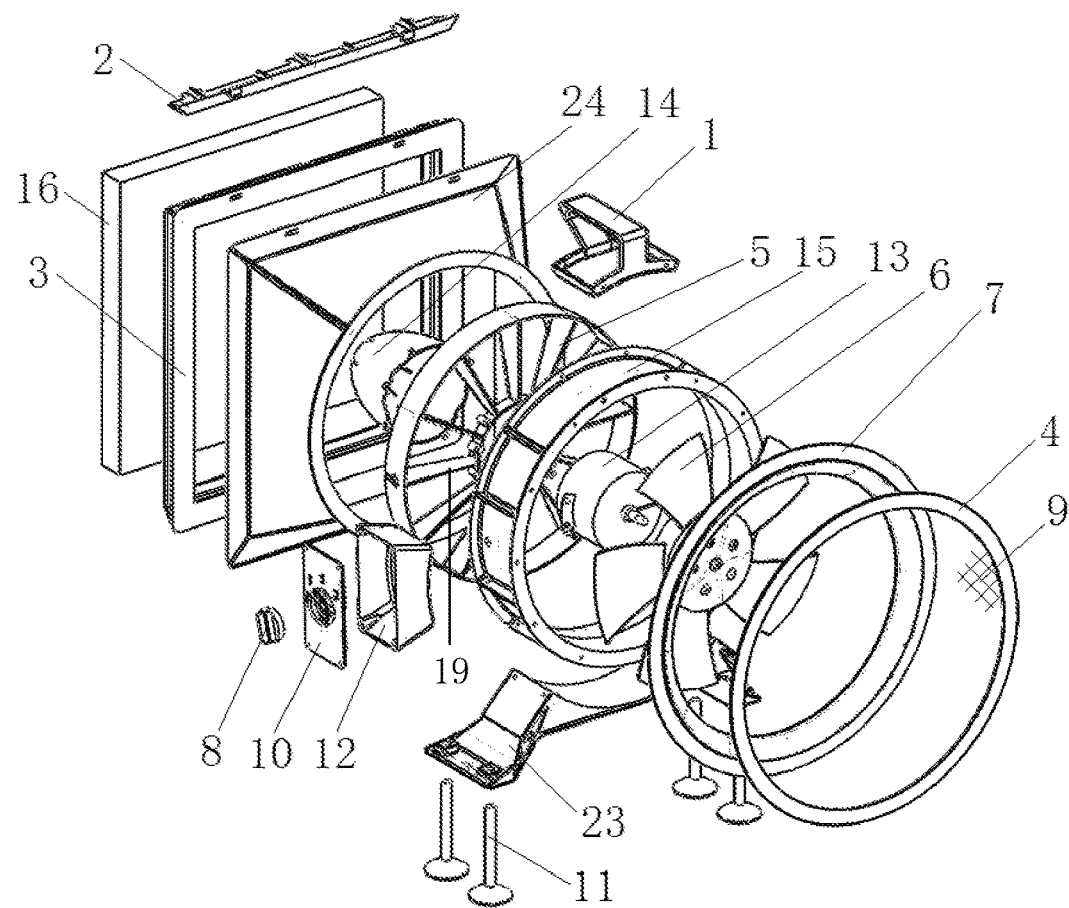
FIG. 9 is a schematic drawing of a high-efficiency embodiment of the air purifier system in an exploded perspective view.
Figure 10:
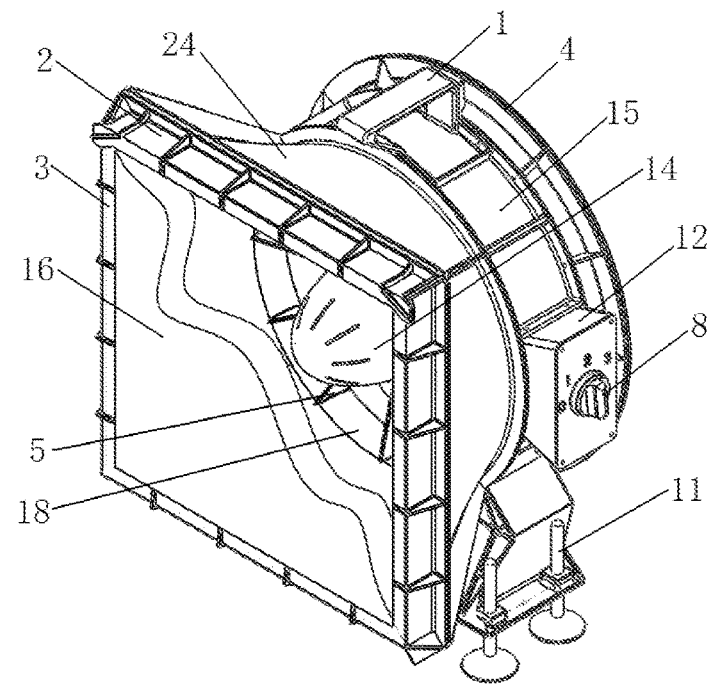
FIG. 10 is a perspective view showing the assembled structure of the FIG. 9 embodiment.

The high efficiency embodiment depicted in FIG. 9 is modular to illustrate different aerodynamics-related parts and their functions. It also serves as a useful rapid-prototyping embodiment for part-by-part experimental optimization. An embodiment suitable for mass-production is depicted in FIGS. 19-21. The mass-production embodiment is made using compression molding and assembled with screws.

For the guide vanes (5) of FIG. 19 camber and twist have been omitted to facilitate removal from a mold. As a result, they can be described as flat-plate guide vanes (5). These guide vanes (5) retain their effectiveness because their trailing edges align with the desired axial flow direction and they are sufficiently numerous to impose their geometry on the flow.

The lid (2) has been omitted in favor of using snaps (41) attached to the filter housing (3a, 3b) for installation and removal of the filter (16). A skirt (42) has been added to cover the height and tilt adjusters (11) and two side-panels (43) have been included to further improve the aesthetics of the air purifier. Threaded elements (44) are embedded in the seat (23a, 23b) to mate with the height and tilt adjusters (11). A rotary switch (45) and capacitor (46) are also shown.

Figure 23:
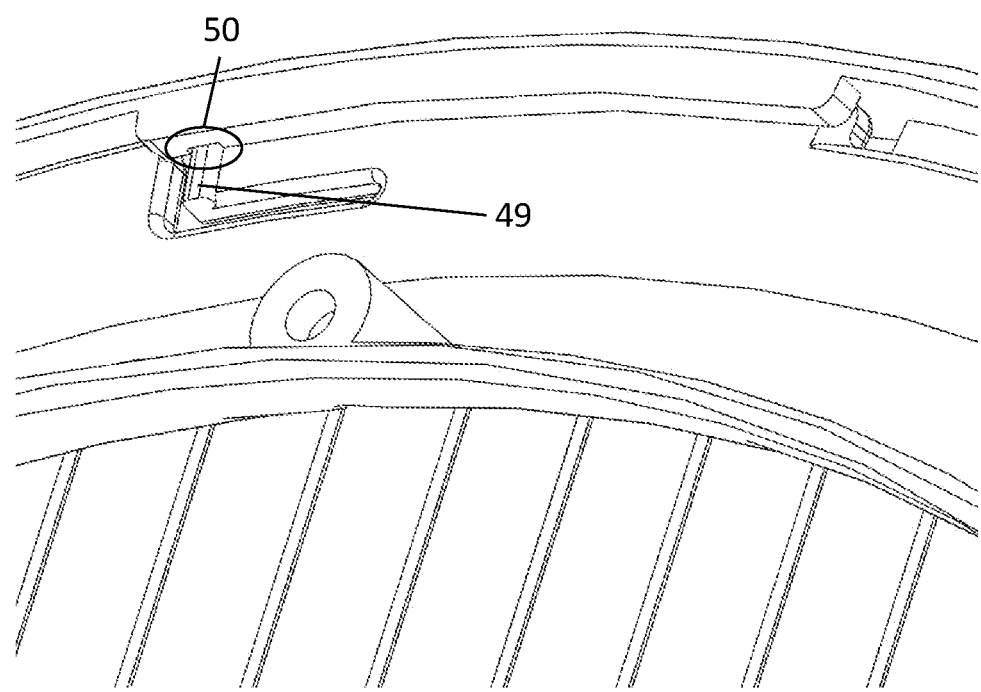
FIG. 23 illustrates an example locking mechanism for an inlet+docking ring connection.

The docking ring (4) for all embodiments is the part used to hold the prefilter (9) or barrier in-place; it may or may not be used to facilitate installation of the air purifier system at a window. In practice, the docking ring (4) can have a wide variety of shapes and need-not be annular. In the example embodiment of FIG. 25 the docking ring (4) can be turned approximately 10 degrees to unlock it from the inlet (7) using a tongue (47)-and-groove (48) type design. A protruding part (49) located on the outer surface of the inlet (7) snaps into a slot (50) on the docking ring (4), as depicted in FIG. 23. This allows a prefilter (9) to be quickly and easily rinsed-clean and reinstalled. The docking ring (4) design also facilitates convenient access to the fan (6), motor (13), and housing (15) so they can be wiped-clean with a damp cloth after accumulating dust.

Many discrete parts from the FIG. 9 embodiment have been combined to reduce the number of manufacturing steps and the overall cost of production. For example: the carry handle (1), guide vanes (5), electrical control box cover (11), electrical control box (12), motor cover (14), housing (15), and half of the seat (23b) can all be stamped-out as one piece of continuous plastic (FIG. 19). One can imagine other embodiments in which various groups of parts are combined in a similar way. For example, the docking ring (4), inlet (7), and prefilter (9) or barrier could be combined into one continuous piece that attaches and detaches directly to-and-from the housing (15). Such embodiments are understood to fall within the scope of the present invention.

(6) Installation

Installation of the air purifier system may include a wind-blocking sheet (20). The wind-blocking sheet (20) has an air inlet hole (35) and may include a connecting ring (36) applied around the air inlet hole (35) that mates in a temporary, easily-removable, fashion with the docking ring (4). The docking ring (4) can also have a locking connection with the connecting ring (36) in a variety of ways, including using: glue, double-sided tape, snaps, screws, magnets, etc. Height and tilt adjusters (11) are used to align the docking ring (4) with the connecting ring (36).

Figure 16:
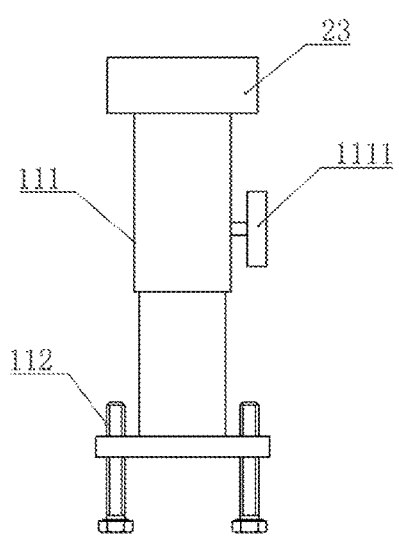
FIG. 16 is a side view of another height and tilt adjustment mechanism for the air purifier system.
Figure 17:
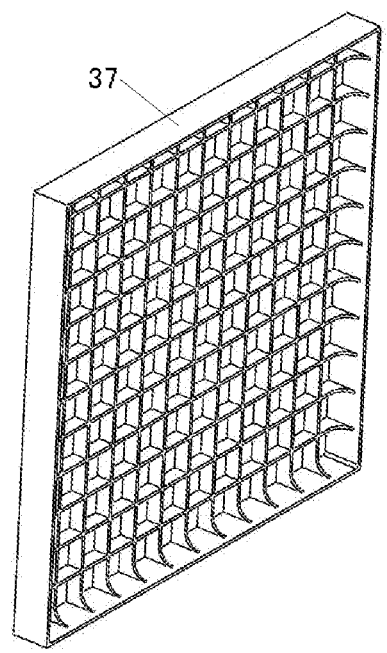
FIG. 17 is a perspective schematic structural view of the air purifier system's safety cage.
Figure 18:
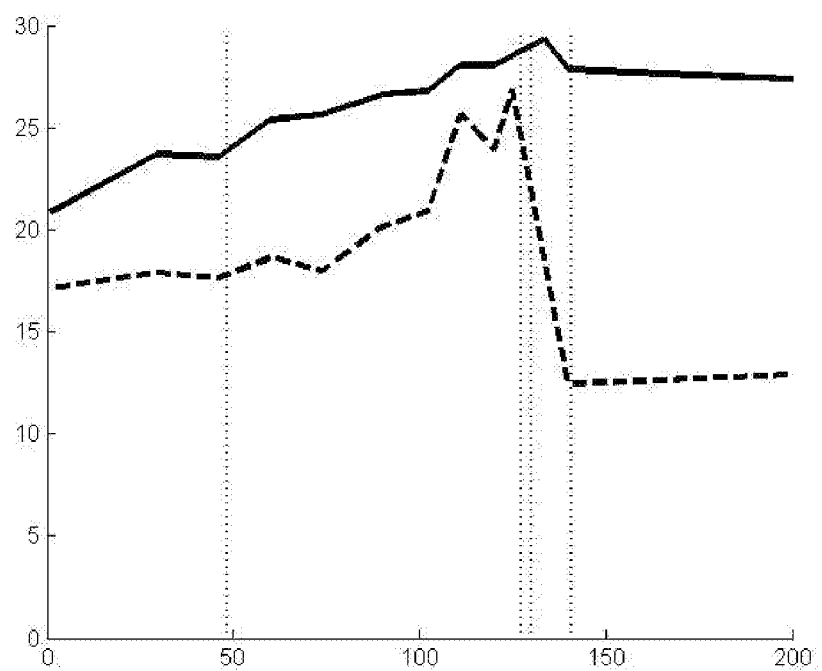
FIG. 18 is a radial pressure distribution graph corresponding to early embodiments of the air purifier system.
Figure 22:
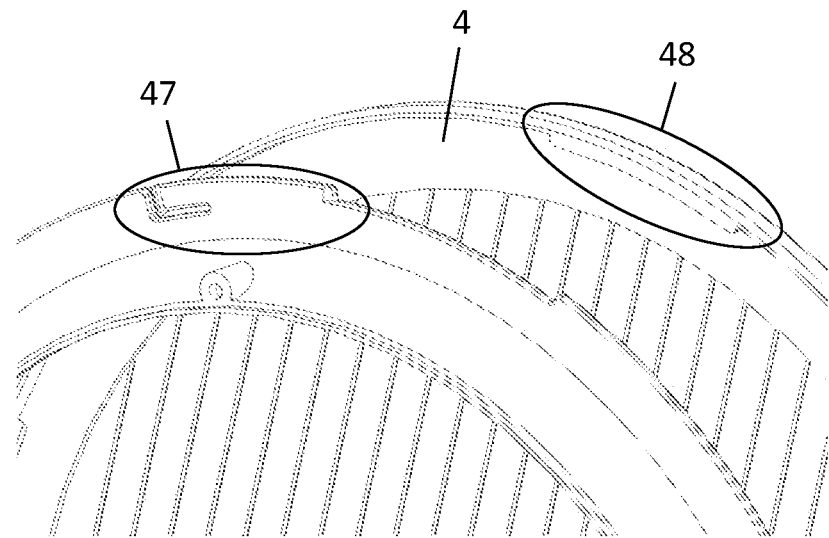
FIG. 22 depicts an embodiment tongue-and-groove connection between the inlet and docking ring.

The function of the wind-blocking sheet (20) is to cover the window, allowing ventilation only through the air inlet hole (35). Preferred materials for the wind-blocking sheet are transparent, and may include: glass, rigid plastic, or a flexible material made from a relatively thin film. For a "do-it-yourself" installation using a thin flexible material the material can be received in a roll with the air inlet hole (35) pre-cut and the connecting ring (36) already attached. The sheet (20) could be cut to the necessary frame-size using scissors. After removing an existing window screen its rubber strip and groove can be utilized to tension and mount the flexible wind-blocking sheet (20). Tape can used to help keep the rubber strip in-place, and a transverse stiffener or damper (22), as depicted in FIGS. 16 and 18, can be used when the wind-blocking sheet (20) is too flexible or weak relative to the applied wind-loading. This situation is likely to occur when the area of the window is large and/or the area is particularly windy. For cases where a permanent installation is desired it is recommended to use glass, as seen in FIG. 17.

After installing the wind-blocking sheet (20) the air purifier system is set on a corresponding windowsill or stand (40). A no-cost installation of an excellent ventilation purifier has been achieved without the need to drill any holes or install complicated room-to-room ducting. There is no damage to the window, its frame, or any other part of the building. To return the window to its original condition simply remove the unit and reinstall the old window screen.

(7) Fan Design

The fan (6) is designed such that incoming air approaches nearly tangent to its blade leading edges and flows smoothly over the blades without separation. The precise shape of the blades is designed to maximize efficiency. As air passes through the fan it undergoes a necessary rise in static pressure, which ultimately drives flow through the filter (16). Due to its rotation, the fan (6) also introduces a circumferential velocity component, which is undesirable as it does not contribute to axial flow through the filter.

Figure 5:
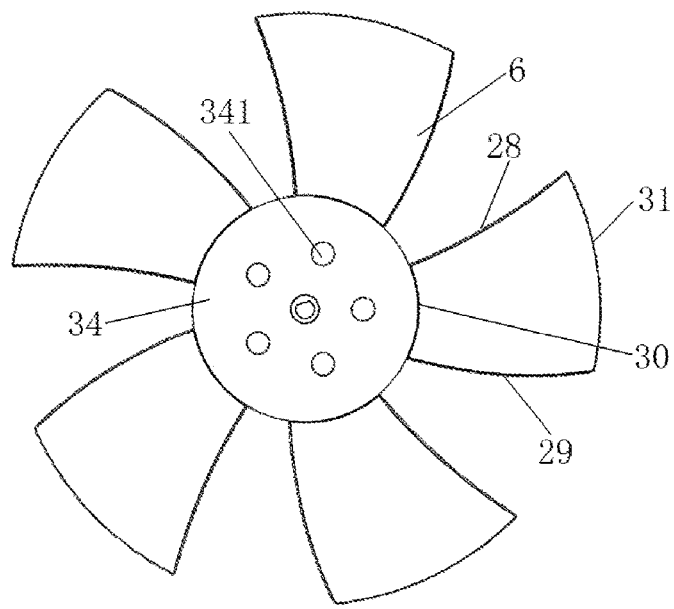
FIG. 5 is an inlet-side schematic drawing of the fan.
Figure 6:
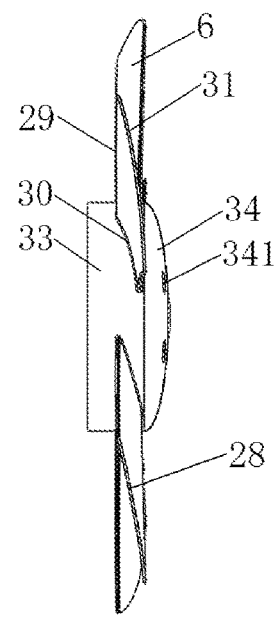
FIG. 6 is a left side view of FIG. 5.
Figure 7:
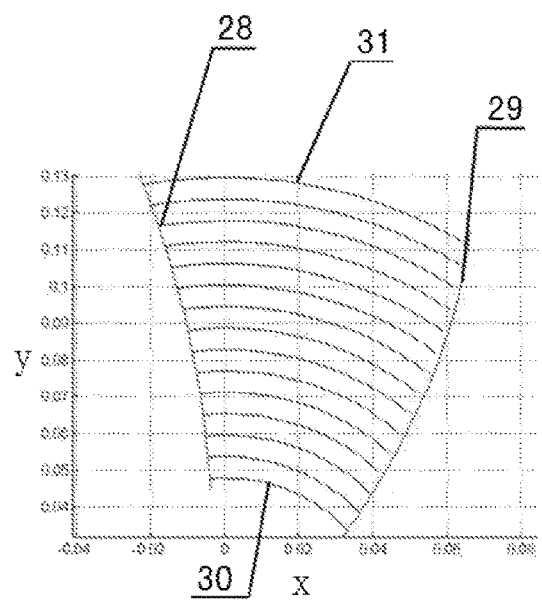
FIG. 7 is an inlet-side fan blade plot with the leading edge, trailing edge, root, and tip labeled.
Figure 8:
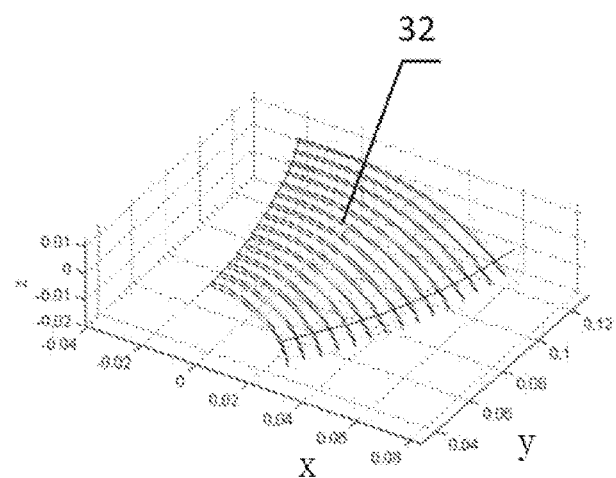
FIG. 8 is a perspective plot of one fan blade, with a cylindrical airfoil labeled.

An embodiment of the fan (6) is depicted in FIGS. 5 through 8. Said fan (6) is custom-designed with parabola-based airfoil camber-lines that are projected onto cylindrical surfaces. These cylindrical airfoils (32) are shown in FIG. 8, where the X axis represents a substantially circumferential direction, Y a substantially radial direction, and Z the axial direction (air flows from high to low Z). The blades are forward-swept; their thickness is constant in the circumferential direction and linearly-tapered in the radial direction. The leading (28) and trailing (29) edges of each blade are parabolic when projected onto a vertical plane, as seen in FIGS. 5 and 7, as given by: $x_{LE}=-1.972y_{LE}^2+0.115y_{LE}-0.005$ and $x_{TE}=-3.615y_{TE}^2+0.945y_{TE}-0.005$. Leading and trailing edges are rounded. Under the same vertical-plane projection the root (30) and tip (31) of each blade is a semi-circle (FIGS. 5 and 7). The blade design of the fan (6) differs from conventional designs. Conventional axial fans with a diameter of approximately 25 cm, a hub diameter of approximately 10 cm, and rotational speeds of approximately 1200 RPM, may have root-to-tip pitch angles of about 15.1 to 38.7 degrees for a total twist of about 23.6 degrees. For the custom fan of FIGS. 5-8 pitch angles vary from 69.3-74.7 degrees for a total twist of 5.4 degrees. Comparing experimentally-determined efficiencies for the simple embodiment of FIG. 1 (in watts per cubic meter per minute, a national standard) the custom fan design improved system performance by approximately 28%.

Embodiments with longer diffusers can tolerate higher fan hub-to-tip ratios without flow separation, allowing higher static pressures and flow rates to be achieved. Such embodiments can also be designed to operate well over a broader range of flow speeds by utilizing more-complex airfoils with non-uniform thickness distributions. For such embodiments the axial fan becomes relatively heavy, and its mass is distributed further away from the axis of rotation. As a result, such fans can be difficult to balance.

(8) Guide Vane Design

Figure 11:
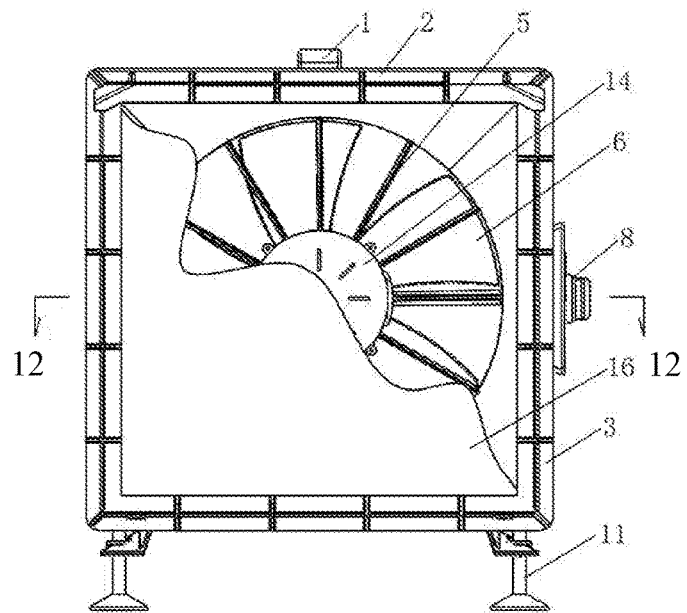
FIG. 11 is a front-view of the FIG. 10 embodiment.
Figure 12:
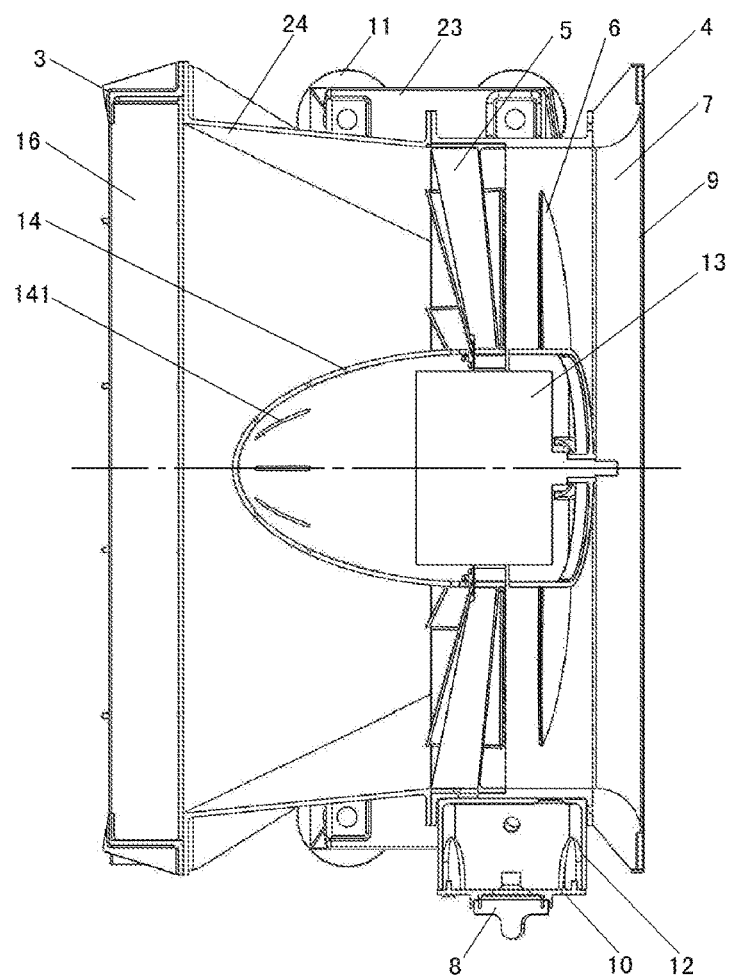
FIG. 12 shows a sectional view of the front-view of FIG. 11 taken at the sectioning place and in the direction indicated by section lines 12-12.
Figure 13:
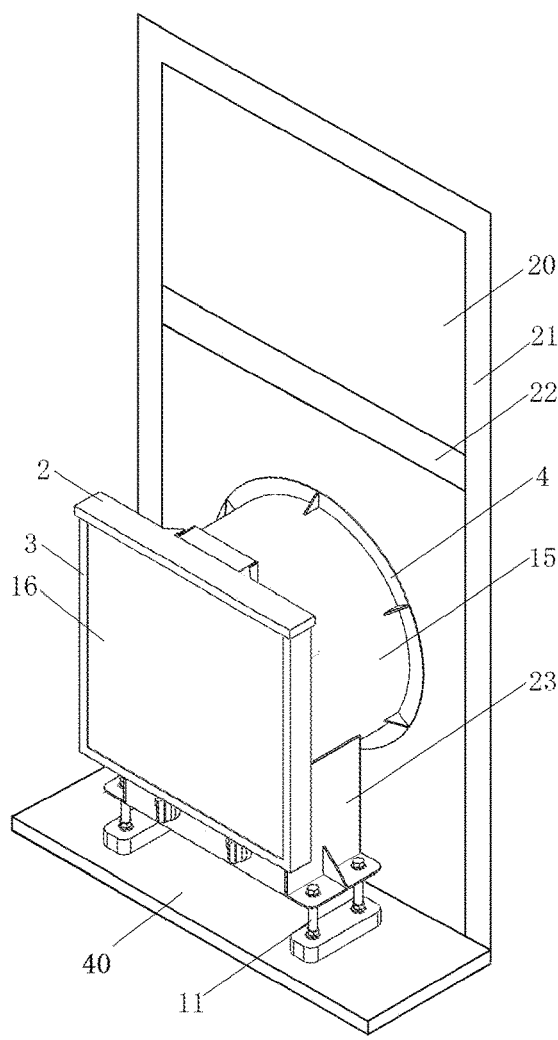
FIG. 13 is a schematic view of the air purifier system installed with a flexible wind-blocking sheet.
Figure 14:
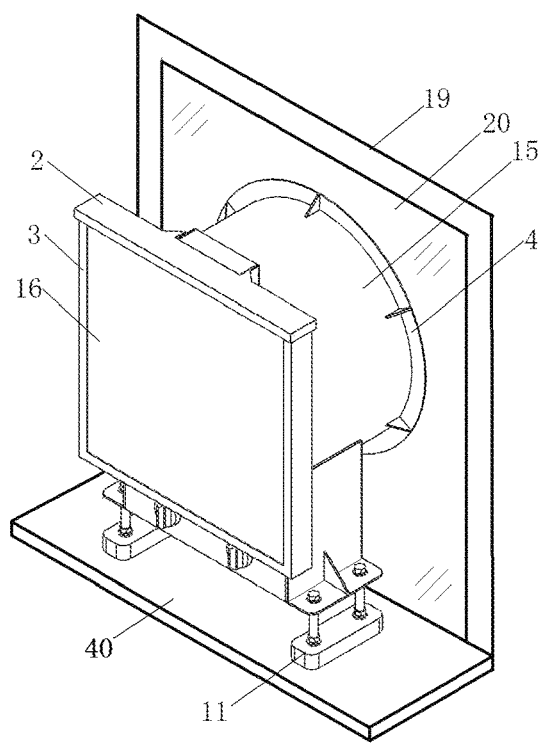
FIG. 14 depicts an embodiment of the air purifier system installed with a glass wind-blocking sheet.
Figure 15:
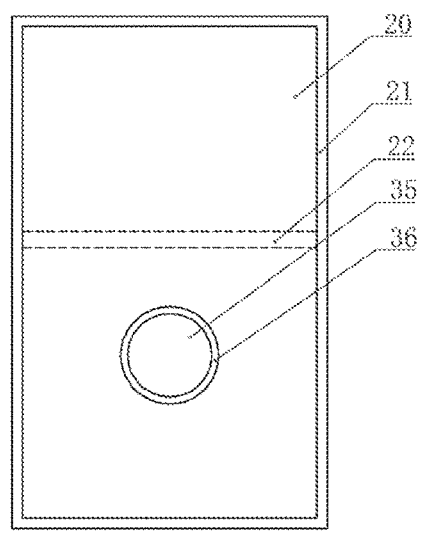
FIG. 15 is a schematic diagram of the installed flexible wind-blocking sheet.

For the high efficiency embodiment depicted in FIG. 11, the motor supports (5) have been replaced with guide vanes (5). As air leaves the fan blades it approaches these guide vanes (5), which are optimally designed when the oncoming flow approaches tangent to a vane's leading edge and exits the vane's trailing edge in the purely axial direction. Guide vanes (5) for the FIG. 9 embodiment utilize NACA 4-digit series airfoils with maximum camber located at three-tenths of the chord-length aft of the airfoil leading-edge. The chord-length tapers linearly from vane tip-to-root while vane thickness is held constant, except at the rounded leading and trailing edges. Guide vanes (5) improve efficiency by recovering swirl energy downstream of the fan (converting unproductive circumferential velocity into axial velocity). To design the guide vanes two unique equations were derived having the following parameters: m is maximum airfoil camber in tenths of chord, V is axial flow speed, Vc is post-fan circumferential flow speed, Δp is the static pressure rise across the fan, ρ is air density, and U is the velocity of the rotating fan blade, which is a function or radial position and fan rotation rate. The first unique equation is: $m=0.105\cdot\delta$, where $$\delta = a\tan\left(\frac{V_0}{V}\right)$$

and the other equation was derived to estimate the post-fan circumferential flow speed, as:

$$V_c \cong 0.154\frac{\Delta p}{\rho\cdot U}.$$

Shape details for the guide vanes (5) (beyond having the proper inlet and outlet angles) are not as important as those of the fan (6). The guide vanes (5) are stationary, causing the flow speed over them to be relatively low. As a result, their shape-effect on system efficiency is reduced. The number of guide vanes (5) is selected to ensure three criterion: (1) that they successfully impose their geometry on the flow, (2) that they adequately support the weight of all mounted components, and (3) that their material use is not excessive. One of the guide vanes (5) is hollow with a thick symmetric airfoil; it serves as the electrical conduit (19) that allows electric wires to run safely from the electric control box (12) to the motor (13) without creating a flow disturbance. The electrical conduit's (19) trailing edge is left open for ease of assembly.

(9) Experimental Results

To verify the performance of the air purifier system an initial simple, high efficiency, and manufacturing embodiment were produced and tested alongside a commercial desktop filter. The method for comparison was volumetric flow rate through the filter divided by power consumption in watts, which is an industry standard. This is not a very fair comparison between desktop purifiers and ventilating purifiers, as the technique of filtering incoming air is much more efficient than the technique of letting dirty air enter and then trying to clean it using a desktop filter (after it has diffused throughout a space).

Table 1 compares three embodiments of the air purifier system during experimental operation, where mean power consumption is presented in watts (W). Supply voltage from the local grid (in China) fluctuates, so values are adjusted to correspond to 220V. The mass production embodiment uses a more efficient electrical motor and has four power-settings (not three).

TABLE 1

Average power consumption (W)

| Power setting | 1 (low) | 2 (medium) | 3 (high) |
|---|---|---|---|
| Simple embodiment of the air purifier system (FIG. 1) | 22.9 | 26.5 | 35.0 |
| High-efficiency embodiment of the air purifier system (FIG. 9) | 22.1 | 26.4 | 35.2 |
| Mass production embodiment of the air purifier system (FIG. 19) | 20.3 | 21.1, 22.0 | 25.2 |

Table 2 compares the performance of different air purifier systems having the same nominal power and voltage for their motors. Niu Kee is a typical commercially-available desktop filtration system utilizing an axial fan.

TABLE 2

Flow-rate (m3/min) through a HEPA filter for systems with the same nominal power

| Power setting | 1 (low) | 2 (medium) | 3 (high) |
|---|---|---|---|
| Niu Kee purifier (HEPA filter only) | — | — | 1.00 |
| best tested HEPA strapped to a desktop fan combination | — | — | 1.23 |
| Simple embodiment of the air purifier system (FIG. 1) | 1.44 | 1.82 | 2.18 |

TABLE 2-continued

Flow-rate (m3/min) through a HEPA filter for systems with the same nominal power

| Power setting | 1 (low) | 2 (medium) | 3 (high) |
|---|---|---|---|
| High-efficiency embodiment of the air purifier system (FIG. 9) | 2.11 | 2.62 | 3.06 |
| Mass production embodiment of the air purifier system (FIG. 19) | 1.97 | 2.78, 3.38 | 3.97 |

FIG. 18 shows pressure distribution along the radial direction at power-setting 2. Radial distance from the center of the fan is given along the x-axis in mm. Pressure difference across the filter (16) is given on the y-axis in Pa. The thick solid line corresponds to the high efficiency embodiment, while the thick dotted line corresponds to the simple embodiment—both at power-setting 2. Vertical dashed lines denote key radial positions: r=48.5 is the radius of the fan hub, r=127.5 is the radius of the fan blade tips, r=130 is the inner radius of the housing (15), r=141 is the perpendicular distance between the shaft center and one side of the square-shaped filter housing (3), r=199.4 mm is the distance from the shaft center to a corner of the square-shaped filter housing (3).

The flow speed through the filter is proportional to the pressure difference across it, as given on the y-axis of FIG. 18. Integration of the pressure difference across the entire frontal area of the filter yields the total volumetric flow rate of air passing through the filter. A higher-pressure difference, all-else being equal, implies better system performance. Pressure distribution uniformity is desirable because more uniform particle capture is associated with longer filter life. Optimization was completed for the mass production embodiment, which has a significantly higher and nearly flat pressure-distribution line (between 30 and 35 Pa, not shown) corresponding to extremely good performance.

While the foregoing written description of the invention enables a person having ordinary skill in the art to make and use what is considered presently to be the best mode thereof, those of ordinary skill in the art will understand and appreciate the existence of variations, combinations, and equivalents of the specific embodiment, process, and examples herein. The invention should therefore not be limited by the above described embodiments, processes, and examples, but by all embodiments and processes within the scope and spirit of the invention.

What is claimed is:

1. An air purifier comprising:
   a fan mounted for rotation on a shaft, the shaft has a shaft-axis, the fan is substantially surrounded by a fan housing, and the fan is an axial fan
   a motor to rotate the fan on the shaft for causing air to flow;
   a filter supported downstream of the fan, the filter is substantially surrounded by a filter housing; and
   a diffuser supported between the fan housing and the filter, the diffuser has a filter end and a fan housing end, the ends are connected by a wall, the filter end is substantially polygonal or substantially circular in shape and the fan housing end is substantially circular in shape, and the wall tapers inwardly relative to the shaft-axis from the filter end to the fan housing end.

2. The air purifier according to claim 1, wherein the motor comprises the shaft with the shaft-axis, wherein the air flows through the fan primarily in a downstream shaft-axis direction.

3. The air purifier according to claim 1, wherein guide vanes are supported in the fan housing between the fan and the diffuser, each of the guide vanes has a vane body having a leading edge and a trailing edge, wherein guide vane airfoils comprise a camberline whose trailing edge tangent is substantially aligned with a downstream shaft-axis direction.

4. The air purifier according to claim 1, wherein the filter housing further comprises:
   a first filter housing part;
   a second filter housing part; and
   at least one snap,
   wherein the first filter housing part and the second filter housing part are held together by the at least one snap,
   the filter is held in-place between the first filter housing part and the second housing part, and
   the filter housing is located downstream of the fan.

5. The air purifier according to claim 1, wherein an inlet is supported upstream of the fan, and a prefilter is supported upstream of the inlet, the inlet includes a fan face, a prefilter face, and an arcuate annular wall connecting each of the faces, the annular wall extends outward away from the shaft-axis from the fan face to the prefilter face,
   a docking ring upstream of the prefilter and the inlet removably secures the prefilter to the prefilter face of the inlet.

6. The air purifier according to claim 1, wherein the prefilter is a filter selected from the group consisting of a non-mesh filter, a multi-layered filter and a barrier filter with a mesh.

7. The air purifier according to claim 6, wherein the filter supported downstream of the fan is a filter of the type selected from the group consisting of a paper filter, a cloth filter, a synthetic fibrous filter, a HEPA filter and a pleated filter.

8. The air purifier according to claim 5, wherein the inlet, the prefilter and the docking ring are a single integral unit.

9. The air purifier according to claim 1, wherein a handle for carrying the air purifier is secured to or integrally formed in a top of the fan housing between an inlet and the diffuser, and adjuster legs for supporting the air purifier extend downwardly from a bottom of the housing between the inlet and the filter.

10. The air purifier according to claim 1, wherein the fan further comprises an axial fan having a hub and five forward swept blades extending from the hub.

11. An air purifier comprising:
    a fan mounted for rotation on a shaft, the shaft has a shaft-axis, the fan is substantially surrounded by a fan housing, and the fan is an axial fan;
    a motor to rotate the fan on the shaft for causing air to flow;
    a filter supported downstream of the fan;
    a diffuser supported between the fan housing and the filter, the diffuser has a filter end and a fan housing end, the ends are connected by a wall, the filter end is substantially polygonal or substantially circular in shape and the fan housing end is substantially circular in shape, and the wall tapers inwardly relative to the shaft-axis from the filter end to the fan housing end;
    an inlet is supported upstream of the fan, and a prefilter is supported upstream of the inlet; and,
    a docking ring removably secures the prefilter to the inlet, wherein the docking ring and the inlet have complementarily shaped portions on respective outer peripheral edges or faces, which mate together when the portions are aligned and the docking ring rotated relative to the inlet so that the docking ring and the inlet are removably secured together with the prefilter removably held there between.

12. The air purifier according to claim 11, wherein the inlet includes a fan face, a prefilter face, and an arcuate annular wall connecting each of the faces, the annular wall extends outward relative to the shaft-axis from the fan face to the prefilter face.

* * * * *